United States Patent
Buncy, Jr. et al.

(10) Patent No.: US 7,950,677 B2
(45) Date of Patent: May 31, 2011

(54) SLED ATTACHMENT FOR LOAD CARRYING CART

(76) Inventors: Earl Buncy, Jr., Caneadea, NY (US); Patricia Buncy, Caneadea, NY (US)

( * ) Notice: Subject to any disclaimer, the term of this patent is extended or adjusted under 35 U.S.C. 154(b) by 146 days.

(21) Appl. No.: 12/399,107

(22) Filed: Mar. 6, 2009

(65) Prior Publication Data

US 2010/0225076 A1   Sep. 9, 2010

(51) Int. Cl.
*B62D 39/00* (2006.01)
(52) U.S. Cl. ........... 280/33.992; 280/8
(58) Field of Classification Search ........... 280/8, 10, 280/12.11, 23.1, 33.991, 33.994, 33.995, 280/47.34, 47.35, 809, DIG. 4
See application file for complete search history.

(56) References Cited

U.S. PATENT DOCUMENTS

| | | | | |
|---|---|---|---|---|
| 659,560 A * | 10/1900 | Tietjen | ......................... | 280/7.12 |
| 1,952,467 A * | 3/1934 | Slee | .............................. | 280/23.1 |
| 2,914,340 A * | 11/1959 | Black | ........................... | 280/86.1 |
| 3,306,660 A * | 2/1967 | Williams | ....................... | 297/133 |
| 3,719,370 A * | 3/1973 | Gintick et al. | ........... | 280/33.994 |
| 3,837,663 A * | 9/1974 | Ness | .................................. | 280/8 |
| 3,851,891 A | 12/1974 | Liu | | |
| 3,927,894 A * | 12/1975 | Zawislak | ......................... | 280/8 |
| 4,040,638 A * | 8/1977 | Flagg | ................................ | 280/9 |
| 4,121,788 A * | 10/1978 | McMahon | ....................... | 244/50 |
| 4,163,564 A * | 8/1979 | Kramer | ........................... | 280/10 |
| 4,191,391 A * | 3/1980 | Dorlini | ............................. | 280/9 |
| 4,320,904 A * | 3/1982 | Walters et al. | ............... | 280/7.12 |
| 4,589,668 A | 5/1986 | Mares | | |
| 5,350,182 A * | 9/1994 | Hurst | ........................ | 280/33.996 |
| 5,441,285 A * | 8/1995 | Russell et al. | .................. | 280/10 |
| 5,581,915 A * | 12/1996 | Lobato | ............................ | 37/285 |
| 6,412,795 B1 * | 7/2002 | Beumer et al. | ........... | 280/33.991 |
| 6,422,580 B1 * | 7/2002 | Hunter | ..................... | 280/33.992 |
| 7,073,800 B2 * | 7/2006 | Shaw et al. | ............. | 280/33.991 |
| 7,121,560 B1 | 10/2006 | Balzano | | |
| 7,364,170 B2 | 4/2008 | Aittama | | |
| 2006/0055133 A1 * | 3/2006 | Montalvo | ................. | 280/33.992 |
| 2006/0108750 A1 * | 5/2006 | Moscaret et al. | ................. | 280/8 |
| 2006/0145436 A1 * | 7/2006 | Varricchio | .............. | 280/33.992 |
| 2009/0150243 A1 * | 6/2009 | Scheffer | ........................ | 705/14 |

FOREIGN PATENT DOCUMENTS

EP         161707 A2 * 11/1985
* cited by examiner

*Primary Examiner* — J. Allen Shriver, II
*Assistant Examiner* — Brodie Follman
(74) *Attorney, Agent, or Firm* — Jerry D. Haynes

(57) ABSTRACT

A sled attachment configured to a load carrying cart for maneuvering thereto on pathways covered with snow, ice and/or slush. The load carrying cart comprises a frame supported over a pair of front wheels and a pair of rear wheels. The sled attachment comprises a panel member and at least one fastening member. The panel member includes a first arcuate section and a second arcuate section. The second arcuate section extends inwardly toward the first arcuate section from a common edge portion of the first arcuate section and the second arcuate section. The at least one fastening member is capable of removably engaging the panel member to a portion of the frame. The panel member is capable of being removably engaged, such that the first arcuate section poses outward from the frame and the second arcuate section poses toward a lower portion of the pair of front wheels.

7 Claims, 3 Drawing Sheets

SLED ATTACHMENT FOR LOAD CARRYING CART

FIELD OF THE INVENTION

The present invention relates generally to load carrying carts, and more particularly, to a sled attachment for a load carrying cart for enabling a user to maneuver the load carrying cart on pathways covered with snow, ice and/or slush.

BACKGROUND OF THE INVENTION

Load carrying carts, such as shopping carts are widely used for carrying goods from supermarkets to supermarket vehicle parking lots. Typically, a load carrying cart includes a frame supported over a pair of front wheels and a pair of rear wheels. The frame is capable of accommodating goods therein, and the pair of front wheels and the pair of rear wheels are capable of enabling maneuvering of the frame, which in turn enables movement of the load carrying cart. The pair of front wheels and the pair of rear wheels of the load carrying cart enable a user to easily maneuver the load carrying cart over exposed concrete areas and/or plain ground within a supermarket or outside the supermarket while carrying the goods from the supermarket to a supermarket vehicle parking lot. However, maneuvering the load carrying cart through pathways covered with snow, ice and slush in the supermarket parking lot during the winter season may be cumbersome.

Typically, in the winter season, snow, ice and/or slush may accumulate in a supermarket parking lot, and also on the pathways or sidewalks from the supermarket to the supermarket parking lot. On the pathways covered with snow, ice and slush, a task of maneuvering the load carrying cart may become cumbersome. More often than not, the pair of front wheels and the pair of the rear wheels of the load carrying cart may get entrapped in snow, ice and/or slush, thereby blocking free movement of the pair of front wheels and the pair of the rear wheels. Such blockage increases a human effort in maneuvering the load carrying cart on the pathways and sidewalks covered with snow, ice and/or slush.

Accordingly, there exists a need for enabling a user to maneuver the load carrying cart on sidewalks and pathways covered with snow, ice and/or slush. There also exists a need for precluding the entrapment of wheels of the load carrying cart in snow, ice and/or slush for enabling maneuvering of the load carrying cart in a manageable manner.

SUMMARY OF THE INVENTION

In view of the foregoing disadvantages inherent in the prior art, the general purpose of the present invention is to provide a sled attachment for a load carrying cart, to include all advantages of the prior art, and to overcome the drawbacks inherent in the prior art.

An object of the present invention is to enable a user to maneuver the load carrying cart on pathways covered with snow, ice and/or slush.

Another object of the present invention is to preclude the entrapment of wheels of the load carrying cart in snow, ice and/or slush for enabling maneuvering of the load carrying cart in a manageable manner.

To achieve the above objects, in an aspect of the present invention, a sled attachment for a load carrying cart is provided. The load carrying cart comprises a frame supported over a pair of front wheels and a pair of rear wheels. The sled attachment comprises a panel member, and at least one fastening member. The panel member includes a first arcuate section and a second arcuate section. The second arcuate section extends inwardly toward the first arcuate section from a common edge portion of the first arcuate section and the second arcuate section. The first arcuate section and the second arcuate section are positioned in an outward bulging relation to each other. Further, the at least one fastening member is capable of removably engaging the panel member to a portion of the frame of the load carrying cart. Furthermore, the panel member is capable of being removably engaged to the portion of the frame such that the first arcuate section poses outward from the frame, and the second arcuate section poses toward a lower portion of the pair of front wheels.

The sled attachment for the load carrying cart enables the user to maneuver the load carrying cart on the pathways covered with snow, ice and/or slush. Further, the sled attachment enables the load carrying cart to slide over the pathways covered with snow, ice and/or slush, thereby precluding entrapment of the wheels of the load carrying cart in snow, ice and/or slush for enabling maneuvering of the load carrying cart in a manageable manner.

This together with the other aspects of the present invention, along with the various features of novelty that characterized the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "coupled," and variations thereof herein are used broadly and encompass direct and indirect couplings.

The terms, "first," "second," "top," "bottom," and the like, herein do not denote any order, elevation or importance, but rather are used to distinguish placement of one element over another. Further, the terms, "a" and "an" herein do not denote a limitation of quantity, but rather denote the presence of at least one of the referenced item.

The present invention provides a sled attachment for a load carrying cart, such as a shopping cart. The sled attachment enhances a mobility of the load carrying cart on pathways covered with snow, ice and/or slush.

Figure 1:
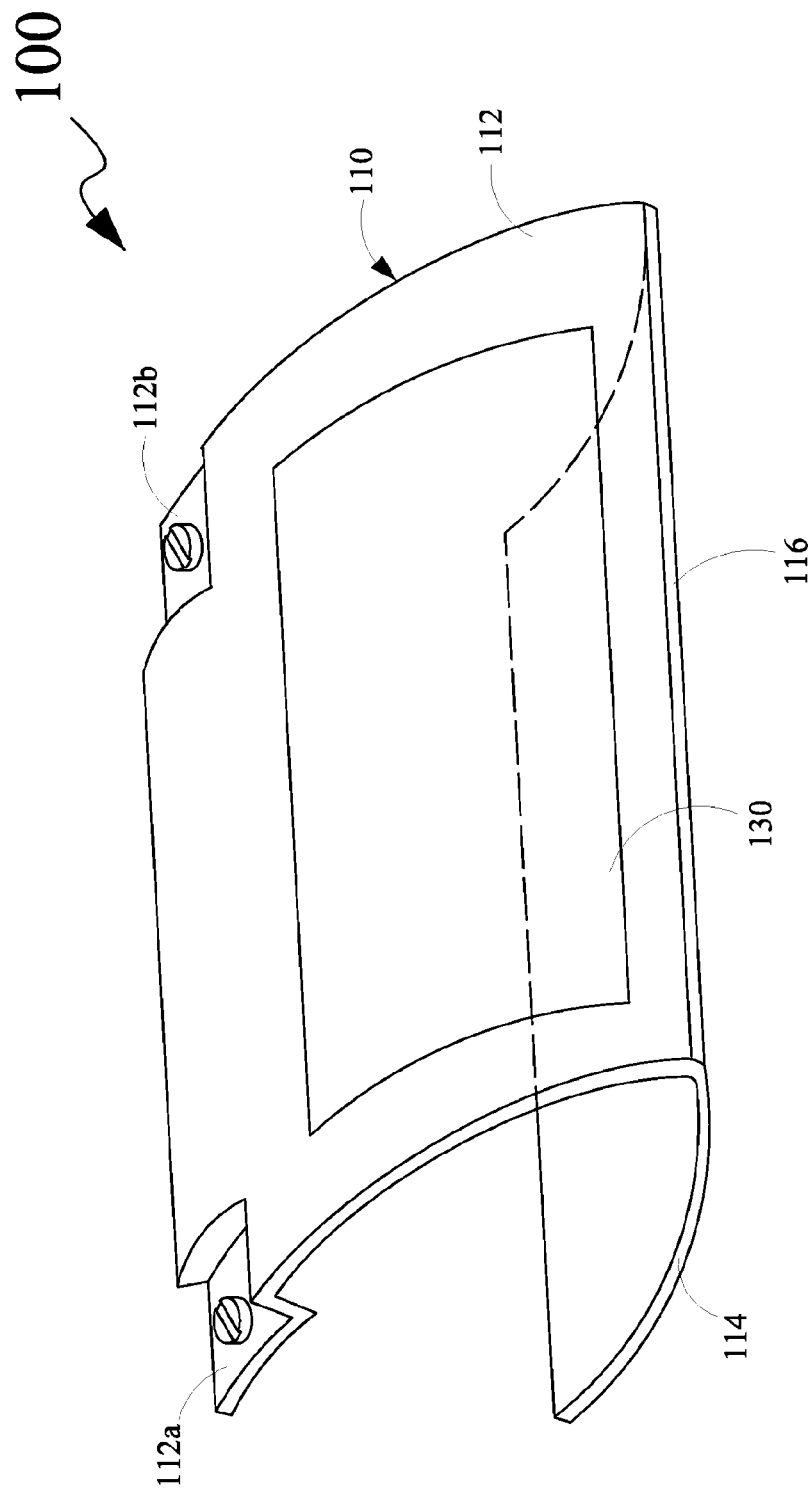
FIG. 1 illustrates a perspective view of a sled attachment, in accordance with an embodiment of the present invention.
Figure 2:
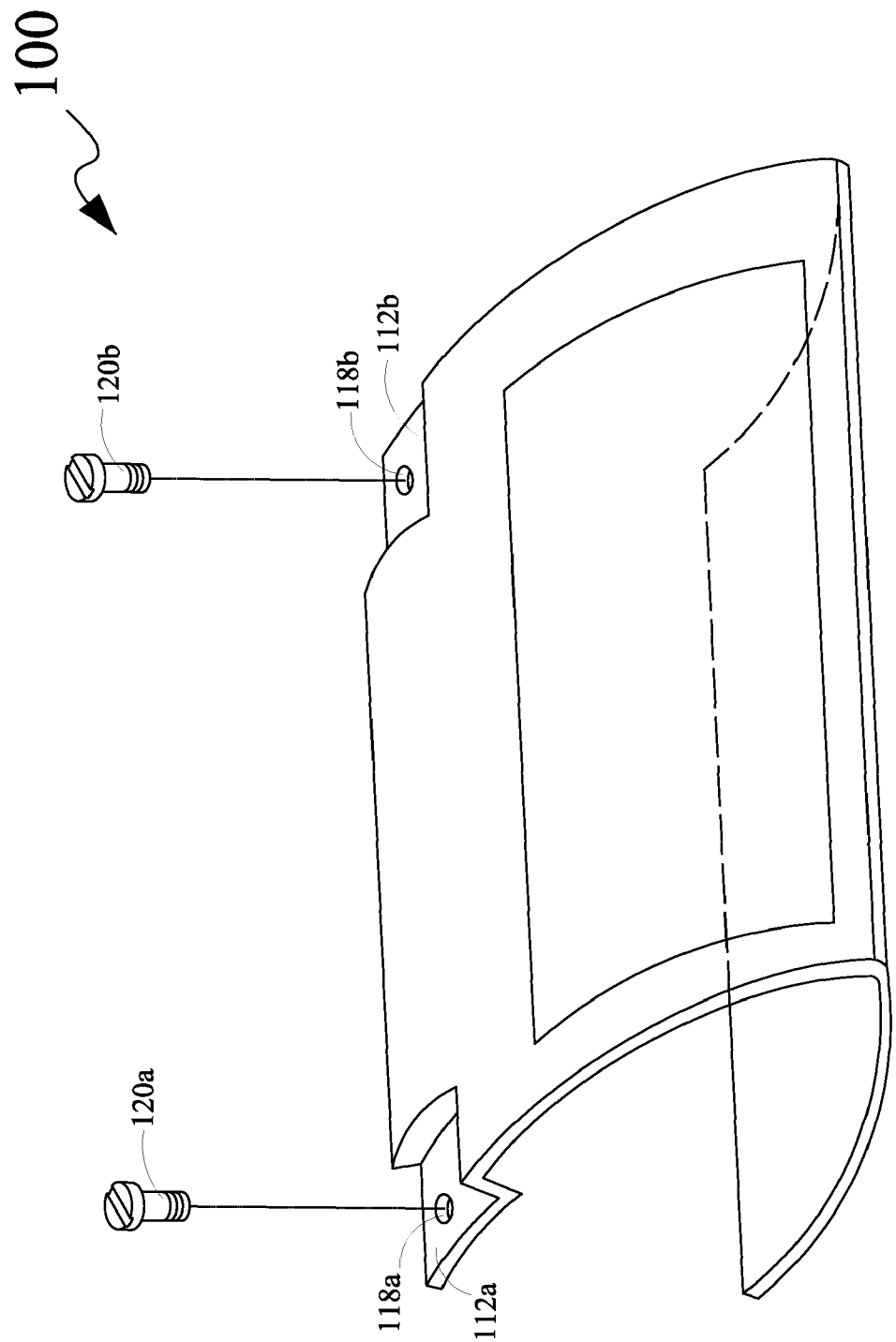
FIG. 2 illustrates an exploded view of a sled attachment, in accordance with an embodiment of the present invention.

Referring now to FIGS. 1 and 2, various views of a sled attachment 100 are illustrated, according to an embodiment of the present invention. More particularly, FIG. 1 illustrates a perspective view of the sled attachment 100, and FIG. 2 illustrates an exploded view of the sled attachment 100.

The sled attachment 100 includes a panel member 110 and at least one fastening member, such as a first fastener 120a and a second fastener 120b. The panel member 110 includes a first arcuate section 112, and a second arcuate section 114. The second arcuate section 114 extends inwardly toward the first arcuate section 112 from a common edge portion 116 of the first arcuate section 112 and the second arcuate section 114. Further, the first arcuate section 112 and the second arcuate section 114 are positioned in an outward bulging relation to each other.

According to one embodiment of the present invention, particularly shown in FIG. 2, the panel member 110 includes at least two through holes, such as a first through hole 118a and a second through hole 118b, configured on the first acruate section 112. More particularly, the first through hole 118a is configured on a first corner portion 112a of the first arcuate section 112, and the second through hole 118b is configured on a second corner portion 112b of the first arcuate section 112.

Further, the at least one fastening member, such as the first fastener 120a and the second fastener 120b, is capable of being received in the at least two through holes, such as the first through hole 118a and the second through hole 118b. More particularly, the first fastener 120a is capable of being received in the first through hole 118a, and the second fastener 120b is capable of being received in the second through hole 118b. According to one embodiment of the present invention, each of the first fastener 120a and the second fastener 120b may be a bolt, such as an Original Equipment Manufacturer (OEM) bolt. However, it will be evident to a person skilled in the art that other type of fastening member, such as rivets may be used for fastening the panel member 110 to a frame (shown in FIG. 3) of a load carrying cart.

According to one embodiment of the present invention, the panel member 110 includes an advertising space 130. More particularly, a top portion of the first arcuate section 112 may be utilized as the advertising space 130 for advertising a desired content thereon. The top portion of the first arcuate section 112 provides the advertising space 130 of substantially large size that may be utilized for advertising a desired content of equally large size.

Further, the sled attachment 100 may have a dimension that facilitates the sled attachment 100 to be secured on a load carrying cart (not shown), such as a shopping cart, for achieving the purpose of the sled attachment 100. In one embodiment of the present invention, the sled attachment 100 may have a length of about 13.90 inches. Further, the first arcuate section 112 of the sled attachment 100 may have a width of about 8.92 inches, and width of the second arcuate section 114 of the sled attachment 100 may be configured to be about 6.21 inches. However, it will be evident to a person skilled in the art to configure a sled attachment, such as the sled attachment 100 of desired length having the first arcuate section 112 and the second arcuate section 114 of desired length and width.

According to one embodiment of the present invention, the sled attachment 100 is one piece arrangement made of a plastic polymer, such as polypropylene. The one piece arrangement of the sled attachment 100 may be obtained by molding the plastic polymer through an injection molding process. However, it will be evident to a person skilled in the art that other types of plastic polymer and processes may be used for manufacturing the sled attachment 100.

Figure 3:
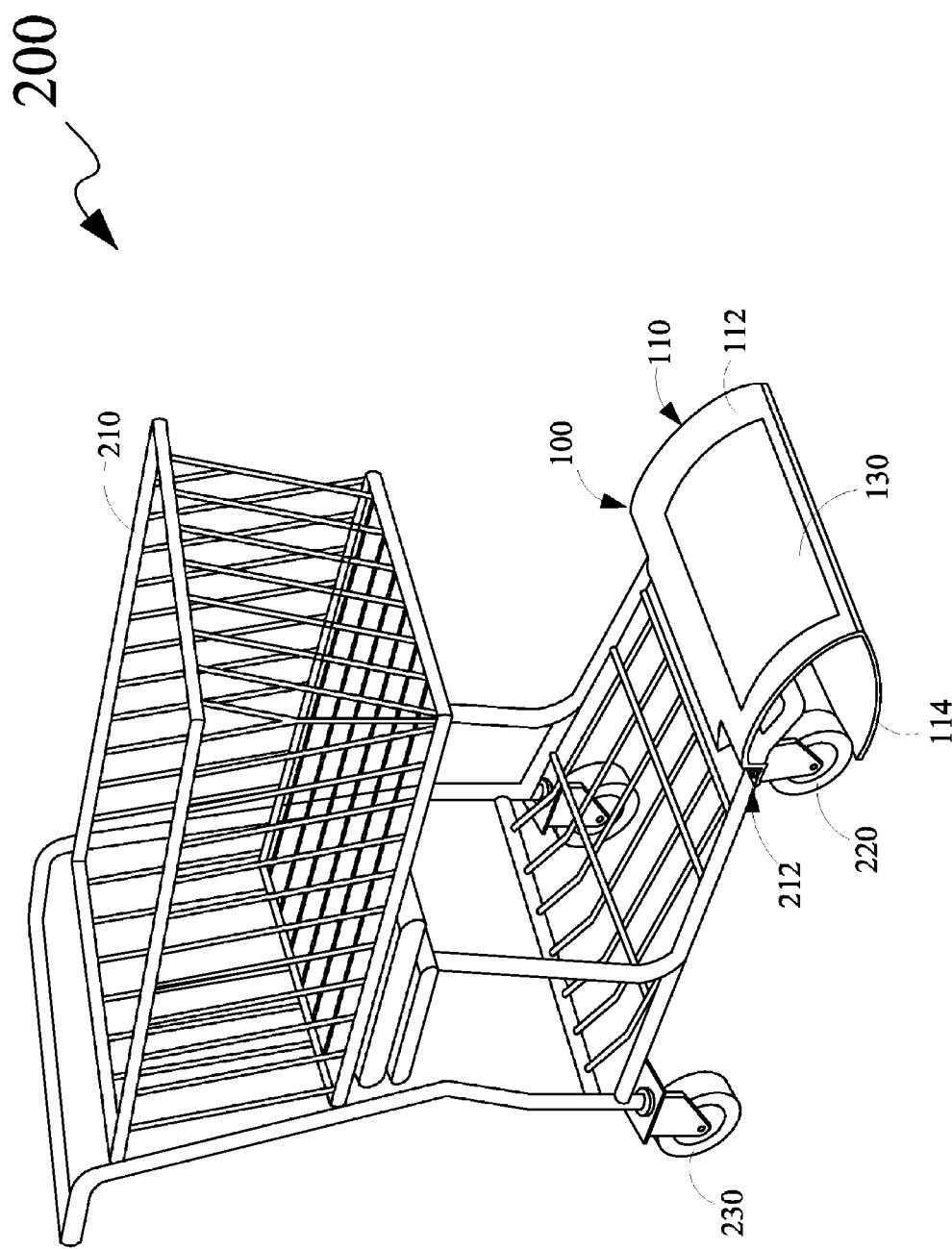
FIG. 3 illustrates a view of a sled attachment engaged to a load carrying cart, in accordance with an embodiment of the present invention.

Referring now to FIG. 3, a perspective view of the sled attachment 100 engaged to a load carrying cart 200, is illustrated according to an embodiment of the present invention. For example, the load carrying cart 200 may be a shopping cart. Reference of FIGS. 1 and 2 will be taken herein to describe the engagement of the sled attachment 100 with the load carrying cart 200. The load carrying cart 200 includes a frame 210 supported over a pair of front wheels 220 and a pair of rear wheels 230.

The sled attachment 100 may be removably engaged to a portion of the load carrying cart 200. More particularly, the panel member 110 of the sled attachment 100 may be removably engaged by the first fastener 120a and the second fastener 120b at a bottom portion 212 of the frame 210. The bottom portion 212 may include two holes (not shown) configured thereon for enabling engaging of the panel member 110 with the frame 210 of the load carrying cart 200.

For engaging the panel member 110 to the bottom portion 212 of the frame 210, the first through hole 118a and the second through hole 118b are aligned to respective holes configured on the bottom portion 212 of the frame 210. Accordingly, the first fastener 120a and the second fastener 120b may be received into respective aligned holes of the panel member 110 and the frame 210.

Upon engaging the panel member 110 by the first fastener 120a and the second fastener 120b on to the bottom portion 212 of the frame 210, the first arcuate section 112 poses outward from the frame 210, and the second arcuate section 114 poses toward a lower portion of the pair of front wheels 220. More particularly, the second arcuate section 114 poses underneath the lower portion of the pair of front wheels 220. The second arcuate section 114 may not interface with the pair of front wheels 220 while maneuvering the load carrying cart 200 on concrete areas and/or plain ground.

Further, the sled attachment 100 is retractable in order to utilize the pair of front wheels 220. Furthermore, the sled attachment 100 facilitates maneuvering of the load carrying cart 200 on pathways covered with snow, ice and/or slush without affecting mobility of the load carrying cart 200 on the concrete areas and/or plain ground.

Furthermore, when desired, the sled attachment 100 may be easily and quickly removed by loosening the first fastener 120a and the second fastener 120b from respective aligned holes of the panel member 110 and the frame 210.

A sled attachment, such as the sled attachment 100 of the present invention offers the following advantages. The sled attachment is capable of being secured to a load carrying cart, such as a shopping cart, for maneuvering the load carrying cart on pathways covered with snow, ice and slush. The sled attachment increases mobility of the load carrying cart on the pathways covered with snow, ice and/or slush. The sled attachment is simple in structural configuration thereof, and may be easily engaged to the load carrying cart. Such a sled attachment is also configured to display advertisements thereon. Further, the sled attachment attached with the load carrying cart facilitates workers of supermarkets to collect and redistribute the load carrying cart in the winter season, when the pathways are covered with snow, ice and slush. Such facility in the supermarkets may not affect business thereof in the winter season, as customers may easily maneuver the load carrying cart on the pathways covered with snow, ice and/or slush. Further, the sled attachment is cost effective in terms of material, and manufacturing thereof.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention

What is claimed is:

1. A sled attachment for a load carrying cart, the load carrying cart comprising a frame supported over a pair of front wheels and a pair of rear wheels, the sled attachment comprising:
   a panel member comprising a first arcuate section, and a second arcuate section extending rearward in the same direction as the first arcuate section from a common edge portion of the first arcuate section and the second arcuate section, wherein the first arcuate section and the second arcuate section are positioned in an outward bulging relation to each other and the common edge portion is the farthest forward leading edge of the panel member; and
   at least one fastening member for removably engaging the panel member to a portion of the frame,
   wherein the panel member is capable of being removably engaged to the portion of the frame such that the first arcuate section poses outward from the frame, and the second arcuate section poses toward a lower portion of the pair of front wheels.

2. The sled attachment of claim 1, wherein the panel member comprises at least two through holes configured on the first arcuate section.

3. The sled attachment of claim 2, wherein a first through hole of at least two through holes is configured on a first corner portion of the first arcuate section, and a second through hole of the at least two through holes is configured on a second corner portion of the first arcuate section.

4. The sled attachment of claim 3, wherein the at least one fastening member comprises a first fastener and a second fastener, the first fastener capable of being received in the first through hole and the second fastener capable of being received in the second through hole for removably engaging the panel member to the portion of the frame.

5. The sled attachment of claim 4, wherein each of the first fastener and the second fastener is a bolt.

6. The sled attachment of claim 1, wherein the panel member is made of a plastic polymer.

7. The sled attachment of claim 1, wherein the second arcuate section does not interface with the pair of front wheels while maneuvering the load carrying cart on concrete and plain ground.

\* \* \* \* \*